United States Patent Office 3,123,580
Patented Mar. 3, 1964

3,123,580
AROMATIC ESTERS OF CHLOROBENZENE-GLYCOL CONDENSATION PRODUCT AND POLYMER PLASTICIZED THEREWITH
James H. Dunn and Paul E. Weimer, Baton Rouge, La., assignors to Ethyl Corporation, New York, N.Y., a corporation of Virginia
No Drawing. Filed June 14, 1960, Ser. No. 35,908
5 Claims. (Cl. 260—31.4)

This invention relates to a new composition of matter. More particularly, the invention relates to a polychlorophenoxy-alkoxy compound and its use in polymeric compositions.

It is an object of this invention to provide a new class of organic compounds which are particularly suitable for use as plasticizers, detergents and other purposes. Another object is to provide relatively inexpensive polychlorophenoxyalkoxy compounds and polymeric compositions containing the same. Other objects and advantages of this invention will become apparent from the following description and appended claims.

This invention relates to new and novel compositions of matter comprising the condensation reaction product of a glycol and a polychlorobenzene, and particularly esters derived from such reaction products and their use in polymeric compositions containing polyvinyl chloride, polyvinylidene chloride and polystyrene. The polychlorophenoxyalkoxy compounds of this invention have the following general formula:

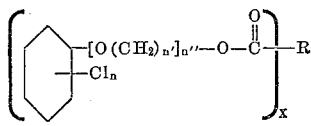

wherein $n$ is an integer between about 1 and 5; $n'$ is an integer from 2 to 3, inclusive; $n''$ is an integer from about 2 through 15, preferably from about 2 through 10 (for reasons appearing hereinafter); $x$ is 1 or 2; R is an aliphatic or aromatic radical to which the carboxy group

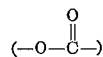

is directly attached, having from about 2–12 carbon atoms, such as acetate, propionate, phthalate, adipate, sebacate, maleate, diglycolate and the like. The phosphate ester appears to resemble the organic esters of this invention and is considered an equivalent. Substituted ester radicals are also suitable, for example, chloroacetate, chlorophthalate, chloroterephthalate, chloroisophthalate, chloroadipate, bromoacetate, bromophthalate, and other halogen derivatives, including iodo and fluoro substituents.

In the above formula, it is preferred that $n''$ be an integer from 2 through 10 because these homologues in general exhibit better overall plasticizer properties (i.e. good compatibility, low volatility, etc.) than where $n''$ is in excess of 10. Usually, however, homologous compounds of this invention wherein $n''$ is an integer from 2 through 6 are highly preferred because of their especially good compatibility in the plastic compositions of this invention, as well as the other desirable properties exhibited thereby. For some utilities, such as exposure of the finished plastic product to high temperatures, it is preferred that $n''$ have a value no lower than 3, i.e. a value ranging from 3 through 10.

An important facet of this invention is the fact that integer $n''$ be at least 2 in the above plasticizers. Polymeric compositions containing plasticizers of this chemical structure are clear, tough plastics exhibiting excellent tensile strength and very low volatility. On the other hand, polymeric compositions containing plasticizers, wherein the integer $n''$ is less than 2 exhibit undesirable discoloration, poor tensile strength and, furthermore, have undesirable volatility characteristics.

The above compounds can be produced by the reaction of polychlorobenzenes with a glycol or a polyglycol to form the corresponding polychlorophenoxyalkoxy compounds, followed by further reaction with an organic acid to form the corresponding ester. The condensation reaction can be illustrated by the following equation:

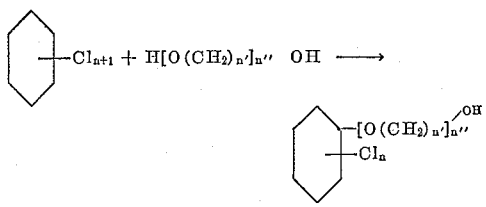

$n$, $n'$ and $n''$ have the values given above.

Suitable glycols for reaction with the polychlorobenzene include ethylene glycol, 1,2-propylene glycol, and 1,3-propylene glycol or the ethers from these glycols such as polyethylene glycol, polypropylene glycol and the like. As noted above, the radical $(OCH_2CH_2)_{n''}$ can vary from between 2 through about 15. It is normally preferred to employ a glycol wherein $n''$ is an integer from 2 through 10 and in some cases 3 through 10.

The polychlorobenzenes suitable for this invention are any of the dichlorobenzenes, trichlorobenzenes, and tetrachlorobenzenes. In addition, pentachlorobenzene and hexachlorobenzene can also be employed. In some cases, mixtures of these compounds or isomers give desirable condensation products.

In carrying out the above condensation reaction, the concentration of the reactants is not particularly critical. In general, the polychlorobenzenes are employed in a concentration of about 0.5 to 3 moles per mole of glycol or polyglycol, although stoichiometric quantities are normally preferred. Excessively high concentrations of trichlorobenzene result in the formation of the di-substituted glycol derivatives, which impurity is undesirable in some cases.

The reaction of the glycol and polychlorobenzene is preferably carried out in the presence of a suitable base, such as alkali and alkaline earth hydroxides, e.g. potassium, sodium, lithium, strontium and calcium hydroxide, and the like. Other basic materials, such as amines, i.e. quaternary ammonium hydroxide can also be employed. The concentration of the hydroxide in the reaction solution is not particularly important. It is preferred to employ at least stoichiometric quantities, but an excess of base in the reaction mixture is frequently desirable.

The temperature of the reaction is also not critical. However, it should be maintained below about 180° C. and preferably below about 160° C. to prevent appreciable formation of the corresponding phenol compound. A reaction temperature should be employed above about 75° C., since the reaction rate at lower temperatures is unduly slow.

The esterification reaction can be conducted in accordance with conventional procedures well-known in the art for esterification of alcohols and acids. Acid anhydrides and acid halides may be used in place of the free acid. In general, it is preferred to employ a temperature in the range of about 50° C. to about 250° C. although temperatures of 75° C. to 150° C. are usually preferred. Normally the reaction is carried out at the reflux temperature of the azeotropic agent employed in the reaction for the removal of the water reaction. In general, a concentration of 0.5 to 4 mole equivalents of the esterifying acid is employed per mole of the polychlorophenoxyalkoxy alcohol. More preferred concentrations are from about 0.8 mole to 1.5 moles equivalent of acid per mole of the polychlorophenoxyalkoxy alcohol. In the case of the acid halide, a base such as pyridine, triethylamine or metal hydroxide is used as a hydrogen halide acceptor.

The esterification reaction, as noted above, is usually conducted in the presence of an azeotropic agent. This agent can be any water-immiscible liquid which is inert to the reactants and products. In general, hydrocarbons are usually employed, including aliphatic, cycloaliphatic, but especially aromatics such as benzene, toluene, xylene and the various naphthalenes. Various catalysts well-known in the art may be used to increase the rate of reaction. Typical of these are sulfuric acid, toluene sulfonic acid, benzene sulfonic acid and the like.

The following are typical examples of polychlorophenoxy-polyalkoxy compounds which can be esterified to produce products of this invention: monochlorophenoxy polyethoxy ethanol, dichlorophenoxy polyethoxy ethanol, trichlorophenoxy polyethoxy ethanol, tetrachlorophenoxy polyethoxy ethanol and pentachlorophenoxy polyethoxy ethanol; trichlorophenoxy polypropoxy propanol. Typical examples of the esterification products are monochlorophenoxy polyethoxy ethyl acetate, dichlorophenoxy polyethoxy ethyl acetate, trichlorophenoxy polyethoxy ethyl acetate, tetrachlorophenoxy polyethoxy ethyl acetate, pentachlorophenoxy polyethoxy ethyl acetate, bis(trichlorophenoxy polyethoxy ethyl)phthalate, bis(dichlorophenoxyethoxy ethyl)phthalate, bis(dichlorophenoxyethoxy ethyl)phthalate, octyl(dichlorophenoxyethoxy ethyl)phthalate, the phosphate of dichlorophenoxyethoxy ethanol, bis(dichlorophenoxyethoxy ethyl) adipate, bis(dichlorophenoxyethoxy ethyl) azelate, bis(dichlorophenoxyethoxy ethyl) sebacate, dichlorophenoxyethoxy ethyl caprylate, dichlorophenoxyethoxy ethyl oleate, tris-(dichlorophenoxy polyethoxy ethyl) phosphatephate, bis(tetrachlorophenoxy polyethoxy ethyl) adipate, bis (trichlorophenoxy polypropoxy propyl) maleate, bis(dichlorophenoxy polypropoxy propyl) sebacate, bis(dichlorophenoxy polyethoxy ethyl) diglycolate, bis-(dichlorophenoxy polypropoxy propyl) phthalate, bis(dichlorophenoxy polypropoxy propyl) adipate, bis(dichlorophenoxy ethoxy ethyl) tetrachlorophthalate, bis(trichlorophenoxyethoxy ethyl) diglycolate and the like.

The following are typical examples which illustrate the preparation of the novel condensation products of this invention.

*Example I*

A reaction vessel was charged with 318 parts (3 moles) of diethylene glycol, 168 parts (3 moles) of solid potassium hydroxide and 326 parts (2 moles) of 1,2,4-trichlorobenzene. The mixture was stirred and heated to 155° C., and 56 parts of water and 5.5 parts trichlorobenzene distilled. The mixture was filtered and vacuum distilled. The dichlorophenoxyethoxyethanol distilled at 180–190° C. at 4 mm. pressure and analyzed 30.21 percent chlorine. (Theoretical: 28.5)

Two hundred (200) parts of the product, dichlorophenoxyethoxyethanol, was charged to a reaction vessel with 60 parts of phthalic anhydride, 300 parts toluene and 1 part of concentrated sulfuric acid. The mixture was heated to reflux and the water azeotropically distilled out, as formed. When no more water was formed, the mixture was cooled and washed with sodium carbonate solution and with water. The toluene was removed by distillation to a temperature of 184° C. and the remaining product treated with activated carbon and filtered. This material had a chlorine content of 21.79. (The theoretical chlorine content was 22.4 percent.) The yield was 92.5 percent of bis(dichlorophenoxyethoxy ethyl)phthalate.

The product, (bis(dichlorophenoxyethoxy ethyl)phthalate) was then formulated into a standard polyvinyl chloride recipe by mixing seventy (70) parts polyvinyl chloride resin, 35 parts of bis(dichlorophenoxyethoxy ethyl)phthalate, 1.5 parts of dibutyltin dilaurate and one part of stearic acid and then milling this mixture on a roll mill at 300° C. The sheet thereby produced banded and milled well, with virtually no order, to form a white, clear, tough polyvinyl chloride sheet with a tensile strength of 5612 p.s.i. (determined on an Instron tensile machine according to the standard ASTM method). The clarity of the PVC sheeting showed that the compatibility of the bis(dichlorophenoxyethoxy ethyl)phthalate was good and the lack of odor during milling demonstrated the low volatility of the bis(dichlorophenoxyethoxy ethyl)phthalate.

Comparison of the above results with polyvinyl chloride sheeting containing the lower homologue, bis(dichlorophenoxy ethyl)phthalate, (the latter compound having been formulated into the same standard polyvinyl chloride recipe in the same proportions as above) demonstrated that the higher homologue, bis(dichlorophenoxyethoxy ethyl)phthalate, was an exceedingly better plasticizer. For example, the lower homologue exhibited a tensile strength of only 2680 p.s.i. (determined by Instron tensile machine) as opposed to the 5612 p.s.i. of the higher homologue. Furthermore, the lower homologue had much poorer volatility characteristics than the higher homologue, the former giving off a pleasant odor during milling, as opposed to virtually no odor when employing the higher homologue, bis(dichlorophenoxyethoxy ethyl)-phthalate. Furthermore, the sheeting containing the higher homologue produced a white, clear tough polyvinyl chloride sheeting, as opposed to a brown, polyvinyl chloride sheeting with the lower homologue. The excellent appearance of the sheet containing the higher homologue is also clear evidence of good compatibility thereof with polyvinyl chloride resin. The brownish appearance of the sheet containing the lower homologue plasticizer is clear evidence of only fair compatibility.

*Example II*

Polyethylene glycol (800 parts by weight) having a molecular weight of about 400 was placed in a vessel equipped with a stirrer. Four hundred and forty-eight (448) parts of a 50 percent potassium hydroxide solution were added to the glycol in the vessel and the mixture was stirred at 70° C. Four hundred and twenty-two (422) parts of 1,2,4-trichlorobenzene were added to this mixture. Heating was continued until the temperature reached 122° C. and maintained at this temperature. Stirring was continued for 5 hours. After cooling, the mixture was poured into a separatory funnel and the potassium hydroxide phase was drawn off. The remaining mixture was washed with hydrochloric acid and filtered. The reaction mixture was dried by heating to a temperature of about 95° C. Five hundred and thirty-six (536) parts of brown liquid dichlorophenoxy polyethoxy ethanol were obtained having a molecular weight of 643, with a chlorine content of 13.4 percent. The theoretical molecular weight is 545, and the theoretical chlorine content is 13.0 percent. The product was soluble in water.

The above dichlorophenoxy polyethoxy ethanol was then esterified by reaction with tetrachlorophthalic anhydride, in the presence of concentrated sulfuric acid and toluene. One hundred and thirty-four (134) parts of the dichlorophenoxy polyalkoxy ethanol were placed in a vessel with a decanter and a reflux condenser. Twenty-nine (29) parts of tetrachlorophthalic anhydride, 200 parts of toluene and 1 part of concentrated sulfuric acid were also added to the vessel. The mixture was refluxed at 110° C. for 6 hours. The reaction mixture was heated with sodium carbonate solution to 75° C. The phases were separated in a separatory funnel and the toluene removed from the oil layer by heating to 200° C. The remaining viscous brown oil was treated with activated carbon and filtered. The product, bis(dichlorophenoxy polyethoxy ethyl) tetrachlorophthalate, had a chlorine content of 18 percent. Theoretical chlorine content is 18.8 percent.

Example III

Dichlorophenoxy polyethoxy ethanol, as prepared in Example II was condensed with phosphorous oxychloride to form the corresponding tris-(dichlorophenoxy polyethoxy ethyl)phosphate. Sixty-two (62) parts (0.1 mole) of the alcohol product of Example I, 8 parts (0.1 mole) of pyridine, and 200 parts of benzene were placed in a vessel fitted with a stirrer. To this mixture, 5.1 parts (0.033 mole) of phosphorous oxychloride were added with stirring. The latter mixture was heated to reflux for one and one-half hours. Excess water was added to the hot reaction mixture and the mixture was allowed to set in a separatory funnel over night. The material was separated in three layers. The benzene layer containing the phosphate ester was heated to 165° C. to remove the benzene. The resulting dark oil had a molecular weight of 1518 and a chlorine content of 10.8 percent. This corresponds to a theoretical molecular weight of 1714 and a theoretical chlorine content of 12.4 percent.

Example IV

The dichlorophenoxy polyalkoxy ethanol prepared as in Example II was reacted with phthalic anhydride according to a similar procedure as described in Example I. The product was a dark liquid with a pleasant odor having a molecular weight of 1508 and a chlorine content of 9.4 percent. The theoretical molecular weight is 1420 and the theoretical chlorine content is 9.9 percent.

Example V

Polypropylene glycol (425 parts by weight) having a molecular weight of about 425 was placed in a vessel equipped with a stirrer. Two hundred and twenty-four (224) parts of 50 percent potassium hydroxide were also added to the glycol in the flask and the mixture was heated with stirring to 75° C. Two hundred and eleven (211) parts of 1,2,4-trichlorobenzene were added to this mixture. Heating was continued until the temperature reached 124° C. and maintained at this temperature, stirring for 5 hours. After cooling, the mixture was poured into a separatory funnel and the potassium hydroxide-salt layer was drawn off. The remaining mixture was washed with hydrochloric acid and filtered. The reaction mixture was dried by heating to a temperature of 255° C. Two hundred and forty-four (244) parts of brown liquid dichlorophenoxy polypropoxy propanol were obtained having a molecular weight of 602 with a chlorine content of 11.5 percent, theoretical molecular weight of 570, and theoretical chlorine content of 12.4 percent. The above condensation product was stirred with 200 parts of benzene, 41 parts of phthalyl dichloride and 41 parts of triethylamine. The triethylamine hydrochloride was filtered off and the filtrate washed with sodium carbonate solution. The solvent was removed by heating to 175° at 30 millimeter pressure. Two hundred sixty-four parts of bis(dichlorophenoxy polypropoxy propyl)phthalate were obtained with a molecular weight of 1295 and chlorine content of 10.2 percent. Theoretical molecular weight is 1350 and theoretical chlorine content is 10.5 percent.

Example VI

In a similar manner, 400 parts of polyethylene glycol having an average molecular weight of about 200 were placed in a vessel equipped with a stirrer with 320 parts of 50 percent sodium hydroxide. The mixture was heated with stirring to 70° C. and 431 parts of 1,2,4,5-tetrachlorobenzene added. Heating was continued until the temperature reached 130° C. and maintained at this temperature with stirring for 5 hours. After cooling, the sodium hydroxide-salt-water layer was separated off and the remaining mixture washed with hydrochloric acid and filtered. Unreacted tetrachlorobenzene was removed by heating the material to 180° C. under a reduced pressure of 25 millimeters.

Three hundred and thirty-six (336) parts of brown liquid trichlorophenoxy polyethoxy ethanol were recovered having a molecular weight of 414 and a chlorine content of 26.4 percent. Theoretical molecular weight for this material is 379 and theoretical chlorine content is 28.2 percent.

The above material was esterified by reacting with 41.8 parts of acetic anhydride in the presence of 200 parts of toluene and 1 part of toluene sulfuric acid. After removal of 7 milliliters of water, the mixture was washed with sodium carbonate solution and the solvent removed by heating to 175° at 30 millimeter pressure. Three hundred seventy parts of trichlorophenoxy polyethoxy ethyl acetate were obtained with a molecular weight of 446 and a chlorine content of 22.4 percent.

Example VII

In a similar manner, 400 parts of polyethylene glycol having an average molecular weight of about 200 were placed in a vessel equipped with a stirrer with 320 parts of 50 percent sodium hydroxide. The mixture was heated with stirring to 70° C. and 501 parts of pentachlorobenzene added. Heat was continued until the temperature reached 130° C. and maintained at this temperature with stirring for 5 hours. After cooling, the sodium hydroxide-salt-water layer was separated off and the remaining mixture washed with hydrochloric acid and filtered. Unreacted pentachlorobenzene was removed by heating the material to 200° C. under a reduced pressure of 25 millimeters.

Four hundred and fifty-two (452) parts of brown liquid tetrachlorophenoxy polyethoxy ethanol were recovered having a molecular weight of 450 and a chlorine content of 32.5 percent. Theoretical molecular weight for this material is 414 and theoretical chlorine content is 34 percent.

The tetrachlorophenoxy polyethoxy ethanol was mixed with 200 parts of toluene, 146 parts adipic acid and 1 part benzene sulfonic acid. The mixture was refluxed until 17.5 milliliters of water were removed. The cooled solution was washed with sodium carbonate solution, filtered and heated to 175° at 30 millimeter pressure to remove toluene. Bis(tetrachlorophenoxy polyethoxy ethyl) adipate (575 parts) was obtained as a clear brown liquid with a molecular weight of 571 and chlorine content of 46.4 percent.

The esters of the present invention are extremely desirable plasticizers for a wide variety of thermoplastic materials. These esters have an exceedingly high molecular weight, low vapor pressure and accordingly do not tend to migrate to any appreciable extent. In addition, the plasticizers provide desirable flame resistant characteristics to normal flammable polymers. Also they can be combined, if desired, with known conventional plasticizers, such as dioctyl phthalate, dioctyl sebacate, dioctyl adipate, and the like. Typical polymers with which the esters of this invention can be employed as plasticizers are polyvinyl chloride, polyvinylidene chloride, polystyrene etc.

In general, the plasticizers of this invention can be employed in a concentration of about 1 to about 100 parts by weight per 100 parts of polymer. Normally it is preferred to use concentrations of between about 5 parts to 50 parts per 100 parts of polymer. The particular concentration employed depends largely on the specific physical properties sought in the final compositions which, in turn, depend largely upon the end use of the plastic composition. Thus, polymeric compositions can be made which provide relatively rigid articles or semi-rigid articles, the more rigid articles being obtained at the lower concentrations of the plasticizer.

The following are typical examples illustrating the use and composition of plasticizers embodying the features of this invention.

Example VIII

To 100 parts of polyvinyl chloride resin was added 50 parts of the phthalate ester of dichlorophenoxy ethoxy ethanol as prepared in Example III. The blend was mixed on a hot roll mill at 300° F. and when cool gave a tough clear semi-rigid sheet with a tensile strength of 5612 p.s.i. This is to be compared with compositions containing a commercial plasticizer such as dioctyl phthalate, used in the same proportions, which has a tensile strength of only 2930.

When a similar polymeric composition is made from a condensation product of a polyethylene glycol (400 molecular weight or 600 molecular weight) and trichlorobenzene, similar results are obtained.

*Example IX*

By blending 10 parts of the phthalate ester of dichlorophenoxy ethoxy ethanol with 100 parts of polyvinyl chloride resin as in Example VII, the sheet obtained from milling was very similar in appearance to the commercial rigid polyvinyl chloride resin and had the unusually high tensile strength of 9530 p.s.i.

*Example X*

Fifty parts of tris-(dichlorophenoxy ethoxy ethyl) phosphate prepared similarly to the phosphate ester in Example II, except that dichlorophenoxy ethoxy ethanol was used, was mixed with 100 parts of polyvinyl chloride resin and roll milled at 300° F. The resulting plastic sheet was clear, brown and tough with a tensile strength of 4282 p.s.i.

When the same plasticizer and concentrations are blended with polystyrene, a similar clear, tough, semi-rigid sheet is obtained having an exceedingly high tensile strength.

*Example XI*

The esters of dichlorophenoxy ethoxy ethanol made from adipic acid, diglycolic acid, sebacic acid, azelaic acid and caprylic acid were prepared as in the above examples and these esters were blended with polyvinyl chloride in the procedure of Example VII. The polymeric sheets obtained using these esters were clear and tough and resembled generally the product obtained in Example VII.

*Example XII*

Esters were prepared by condensing dichlorobenzene with dipropylene glycol and this condensation product was thereafter esterified with maleic acid, in accordance with the procedure of Example I. This ester was then blended with polystyrene in concentrations of 10, 25, and 50 parts per 100 parts of polystyrene to obtain tough, clear, semi-rigid sheets which are highly useful in the formation of articles of manufacture such as toys, lining for tanks or other vessels, pipe and other extrusion products.

*Example XIII*

Tetrachlorobenzene is condensed with triethylene diglycol in a molar ratio of about 1.2 to 1 and this reaction product, in accordance with Example II, is thereafter esterified with a slight excess of phthalic acid. This plasticizer is then blended with polyvinylidene chloride in a weight ratio of 0.5, 0.3 and 0.2 to give semi-rigid, tough plastic sheets which are highly suitable for molded and extruded articles.

*Example XIV*

Pentachlorobenzene is condensed with a molecular equivalent of propylene glycol and this reaction product is thereafter esterified with acetic acid. One hundred parts of this ester is then blended, in accordance with the procedure of Example VII, with 250 parts of copolymer of vinyl chloride and vinyl acetate. This copolymer contains 93 percent vinyl chloride and 7 percent vinyl acetate. The product of this example has very excellent flame resistance.

This application is a continuation-in-part of our prior copending patent application Serial No. 720,082, filed March 10, 1958, now abandoned, which in turn is a continuation-in-part of our prior patent application Serial No. 395,834 filed December 2, 1953, now abandoned.

We claim:

1. A polychlorophenoxyalkoxy compound having the general formula:

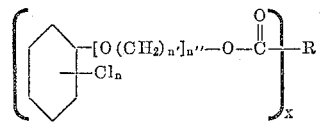

wherein $n$ is an integer from about 1 through 5; $n'$ is an integer of 2–3; $n''$ is an integer from 3 through about 10; $x$ is 1–2; and R is an aromatic hydrocarbon radical containing up to about 12 carbon atoms.

2. A polymeric composition comprising a polymer selected from the group consisting of polyvinyl chloride, polyvinylidene chloride and polystyrene and a chlorophenoxyalkoxy compound having the general formula:

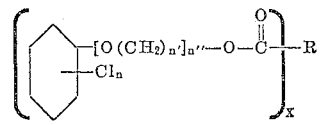

wherein $n$ is an integer from about 1 through 5; $n'$ is an integer from 2–3; $n''$ is an integer from 3 through about 10; $x$ is 1–2; and R is an aromatic hydrocarbon radical containing about 12 carbon atoms, said chlorophenoxyalkoxy compound being present in a concentration of from about 1 through 100 parts per 100 parts of said polymer.

3. The composition of claim 1 wherein said aromatic hydrocarbon radical is o-phenylene.

4. As a new composition of matter, bis(dichlorophenoxyethoxy ethyl)phthalate.

5. The composition of claim 2 wherein said polymer is polyvinyl chloride and said chlorophenoxyalkoxy compound is bis(dichlorophenoxyethoxy ethyl)phthalate.

References Cited in the file of this patent

UNITED STATES PATENTS

| | | |
|---|---|---|
| 2,299,741 | D'Alelio | Oct. 27, 1942 |
| 2,394,512 | Coleman et al. | Feb. 5, 1946 |
| 2,401,261 | MacMullen | May 28, 1946 |

FOREIGN PATENTS

| | | |
|---|---|---|
| 757,681 | Great Britain | Sept. 26, 1956 |